UNITED STATES PATENT OFFICE.

CHARLES BARBEZAT, OF BASEL, SWITZERLAND, ASSIGNOR TO THE FIRM OF "DYE WORKS, FORMERLY L. DURAND, HUGUENIN & CO.," OF BASEL, SWITZERLAND.

DERIVATIVES OF GALLOCYANINS AND PROCESS OF MAKING.

955,040.  Specification of Letters Patent.  Patented Apr. 12, 1910.

No Drawing.  Application filed December 10, 1909. Serial No. 532,446.

*To all whom it may concern:*

Be it known that I, CHARLES BARBEZAT, chemist, a citizen of the Swiss Republic, and resident of Basel, Switzerland, have invented new and useful Derivatives of Gallocyanins and a Process of Making Same, of which the following is a full, clear, and exact specification.

In Letters Patent No. 898098, dated September 8, 1908, is described the transformation of the arylamido-gallocyanins (the products of the action of aromatic amins on gallocyanin dyestuffs), by treatment with acids and reducing agents, into leuco derivatives of decomposition products in which the aryl-amido group is exchanged for the hydroxyl group. It has also been shown that the anilido derivative of "pure prune" (which derivative is the product of the action of anilin on the dyestuff derived from methyl gallate and nitrosodimethylanilin) is decomposed by the action of sulfuric acid into anilin and a leuco derivative of hydroxylized prune (oxy-prune). This formation of a leuco body is due, without doubt, to a still unexplained secondary reaction which is probably analogous to that described in specification of British Letters Patent No. 2306 of 1908, namely the formation of a leuco-gallocyanin derivative by heating ordinary gallocyanin with dilute acids, particularly hydrochloric acid. Hitherto, therefore, under satisfactory technical conditions, these hydroxylized gallocyanins (oxygallocyanins) could be obtained only as leuco derivatives by heating arylamidogallocyanins with acids and reducing agents or with acids alone and solvents. I have now observed that this substitution of the hydroxyl group for the arylamido group and the reduction, under certain conditions, are two wholly independent reactions, and that it is possible with approximately theoretical yields, to obtain unreduced oxygallocyanins by heating the arylamidogallocyanins with acids, two precautions being observed namely not to heat to a higher temperature than is actually necessary for eliminating the amin and to interrupt the heating as soon as the elimination is complete. The temperature at which the elimination proceeds depends more particularly on the arylamidogallocyanin under treatment, but also on the nature of the acid used and its concentration, which may be varied within wide limits. It is easy to determine this temperature very exactly by dissolving in concentrated sulfuric acid, test portions of the mixture being heated; the tests before heating yield red to violet solutions (the characteristic color of solutions of arylamidogallocyanins in concentrated sulfuric acid) but as soon as the elimination begins, the solutions become brown and when the reaction is at an end they are green. As, however, the hydroxylized gallocyanins (oxygallocyanins) and their reduction products (leuco derivatives) both dissolve in concentrated sulfuric acid to green solution, these color reactions cannot show when the second reaction namely the reduction which it is desired to avoid, begins and when, therefore, the heating is to be stopped. For this purpose there is used for the color tests a sulfuric acid of suitable dilution in which the hydroxylized unreduced product dissolves to a brown solution while the hydroxylized reduced product dissolves in it to green solution; for the derivatives of coelestin blue and of gallamin blue a sulfuric acid of 65 per cent. strength is used for the tests, while for derivatives of prune the strength should be 50 per cent. Most mineral acids are adapted to effect this elimination, good results have been attained with hydrochloric acid and with phosphoric acid; dilute sulfuric acid is, however, the best. The hydroxylized gallocyanins (oxygallocyanins) thus obtained, the manufacture of which forms the subject matter of the present invention, differ from the leuco derivatives described in Letters Patent 898098 in that they are more feebly basic and much more difficultly soluble in water. By reduction they pass into more basic and more easily soluble leuco derivatives.

The new products are applicable for the manufacture of new dyestuffs in addition to that of leuco derivatives.

Example I: 84 grams of anilido-coelestin blue are introduced into 500 c. c. of sulfuric acid of 37 per cent. strength; the mixture is heated while stirring; at 75° C. the beginning of the reaction may be observed; the heating is continued for two hours at 75°–80° C.; the mass is then diluted with 270 c. c. of water and filtered while still hot, say at 50° C. The separated product is washed with water, pressed and dried. The oxycoelestin-blue thus obtained is crystalline and brown with a green metallic luster; in concentrated sulfuric acid it dissolves to a green solution which by dilution with water passes to yellow brown; in sulfuric acid of 65 per cent. strength it dissolves to a brown solution, and its leuco derivative to a green solution. The solution in dilute caustic soda lye is violet; the alcoholic solution is blue.

Example II: 98 grams of paradiethyl-amido-anilido-coelestin-blue, made by condensing coelestin-blue with para-amido-diethyl-anilin, and 500 c. c. of sulfuric acid of 37 per cent. strength are heated together while stirring. The reaction begins at 65°–70° C., at which temperature the mixture is maintained for two hours; it is then diluted with 270 c. c. of water and further treated as in the case described in Example I. The yield amounts to 95 per cent. of the theoretical and the product is identical with that obtained as described in Example I. If hydrochloric acid of 22 per cent. strength is substituted for the sulfuric acid in the example, the reaction proceeds at 65° C. and the yield is some 76 per cent. of the theoretical. If, instead of the diethyl-amido anilid of coelestin-blue, the diethylamido-anilid of gallamin-blue be heated with sulfuric acid of 37 per cent. strength, the reaction proceeds at 75°–80° C. The product is crystalline and has a dark color with metallic luster; it dissolves in concentrated sulfuric acid to a bluish green solution, becoming yellow brown when diluted with water; in sulfuric acid of 65 per cent. strength it dissolves to a brown solution, and its leuco derivative to a green solution; the solution in dilute caustic soda lye is red violet. In alcohol it is very slightly soluble to a violet solution.

Example III: 95.2 grams of diethylamido-anilido-prune, made by condensing pure prune with para-amido-diethyl-anilin, are introduced at 20–30° C., into 500 c. c. of sulfuric acid of 37 per cent. strength. On heating further the elimination of the amin begins at 44° C.; the temperature is maintained for two hours at 44°–45° C.; a sample dissolves at the end of the reaction to a green solution in concentrated sulfuric acid and to a yellow brown solution in sulfuric acid of 50 per cent. strength. The mixture is allowed to cool and filtered, the solid matter washed with a little dilute sulfuric acid and drained. The drained product, consisting of brown crystals is treated with 1 liter of water, whereupon these brown crystals lose sulfuric acid and become a green crystalline substance; this is filtered, washed with water, pressed and dried. This green crystalline product dissolves in concentrated sulfuric acid to a green solution, which tends toward yellow brown on dilution with water. In sulfuric acid of 50 per cent. strength it dissolves to a brown yellow solution, and its leuco derivative to a green solution. In dilute caustic soda lye it dissolves to a red solution and in alcohol to a violet solution. If in conducting the heating operation the temperature is maintained for an hour at 60°–65° C., the formation of the leuco derivatives proceeds so far that even on cooling the solution no unreduced product crystallizes.

What I claim is:

1. The described process for the manufacture of new derivatives of gallocyanins suitable for the production of new dyestuffs and of leuco derivatives, by heating the bodies which are obtained by condensing gallocyanins with aromatic amins with a dilute acid at a temperature so low that the decomposition of the said bodies proceeds without reduction of the oxygallocyanins resulting from the said decomposition and by stopping the said heating as soon as the said oxygallocyanins are formed.

2. As new products the described oxygallocyanins, suitable for the manufacture of new dyestuffs and of leuco derivatives, which constitute in dry state crystalline powders dissolving in concentrated sulfuric acid with green coloration turning to yellow-brown on addition of water, in alcohol with blue to violet colorations and in dilute caustic soda lye with red to violet coloration.

In witness whereof I have hereunto signed my name this 19th day of November 1909, in the presence of two subscribing witnesses.

CHARLES BARBEZAT.

Witnesses:
 GEO. GIFFORD,
 AMAND RITTERY.